UNITED STATES PATENT OFFICE.

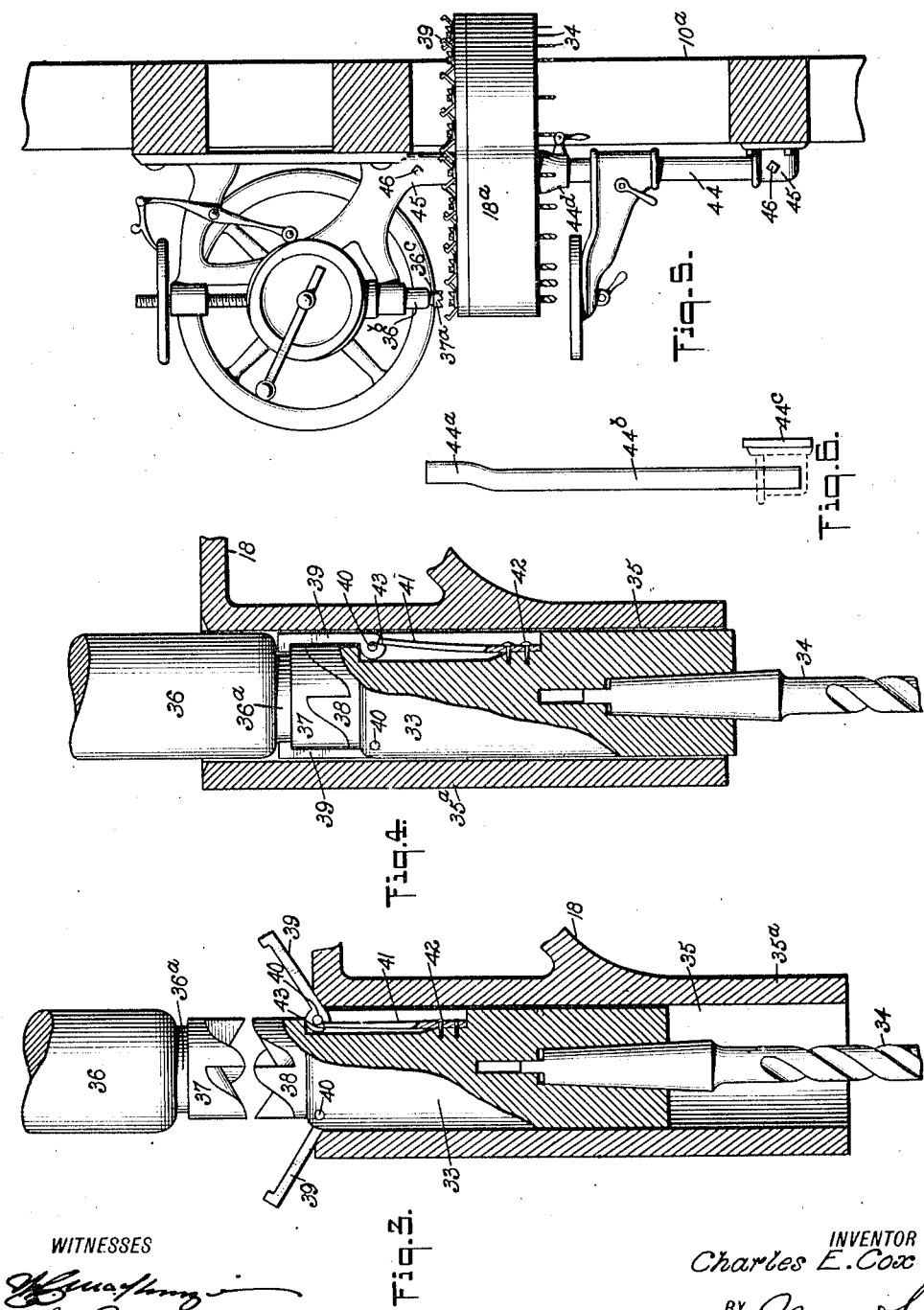

CHARLES EUGENE COX, OF VENICE, CALIFORNIA, ASSIGNOR OF ONE-FOURTH TO BURNHAM F. CROSSMAN, OF LOS ANGELES, CALIFORNIA.

MACHINE-DRILL.

1,270,121.  Specification of Letters Patent.  Patented June 18, 1918.

Application filed May 17, 1917. Serial No. 169,222.

*To all whom it may concern:*

Be it known that I, CHARLES E. COX, a citizen of the United States, and a resident of Venice, in the county of Los Angeles and State of California, have invented a new and Improved Machine-Drill, of which the following is a full, clear, and exact description.

My invention, although adapted for other uses, is more particularly intended for embodiment in a machine for drilling holes in metals or other substances, or performing similar operations thereon, such as reaming, tapping, screw-threading, winding, milling, or like work.

An object of the invention is to provide means whereby the drill bits or other tools are automatically attached to and detached from the actuating means, and whereby a multiplicity of holes may be bored or a plurality of like operations performed in succession without stopping the machine, and the successive operations be performed with convenience and despatch.

An important object of the invention also is to provide automatic means associated with a chuck or equivalent tool holder and a drive spindle therefor, so that an axial movement of the spindle relatively to the chuck will cause the latter to be latched to the spindle and whereby a reverse axial movement of the spindle will disestablish the driving connection with the chuck and cause the latter to be suspended in position until automatically released and again attached to the spindle.

A further object of the invention is to provide a revoluble tool carrier equipped with an annular series of chucks whereby the turning of said carrier will serve to locate a particular chuck in line with the drive spindle, there being means on the tool carrier and arranged in connection with the individual chucks to effect the automatic attachment and detachment of an alined chuck.

The invention furthermore has for an object to provide a cylindrical tool carrier provided with chucks or tool holders for a large number of tools and revolubly mounted on a drill head, whereby to readily position any one of the chucks for engagement with the drive spindle, the drill head being adapted to be readily raised or lowered to give the tool carrier the desired elevation for a particular piece of work.

Another object of the invention is to provide a machine of the indicated character of simple construction insuring strength and durability with the minimum liability of the parts becoming disarranged.

The nature of the invention and its advantages will more clearly appear as the description proceeds.

Reference is to be had to the accompanying drawings forming a part of this specification in which similar reference characters indicate corresponding parts in all the views, it being understood that the drawings are merely illustrative of practical examples of the invention.

Fig. 3 is an enlarged transverse vertical section given to show the means for automatically effecting the attachment or detachment of a clutch, the chuck being shown in the unlatched position;

Fig. 4 is a view similar to Fig. 3, showing the chuck in clutched and latched engagement with the spindle;

Fig. 5 is a side elevation partly in section showing the adaptation of my invention to an ordinary blacksmith's hand drill;

Fig. 6 is a side elevation of a shaft that may be employed in applying my invention to the drill shown in Fig. 5.

Figure 1:
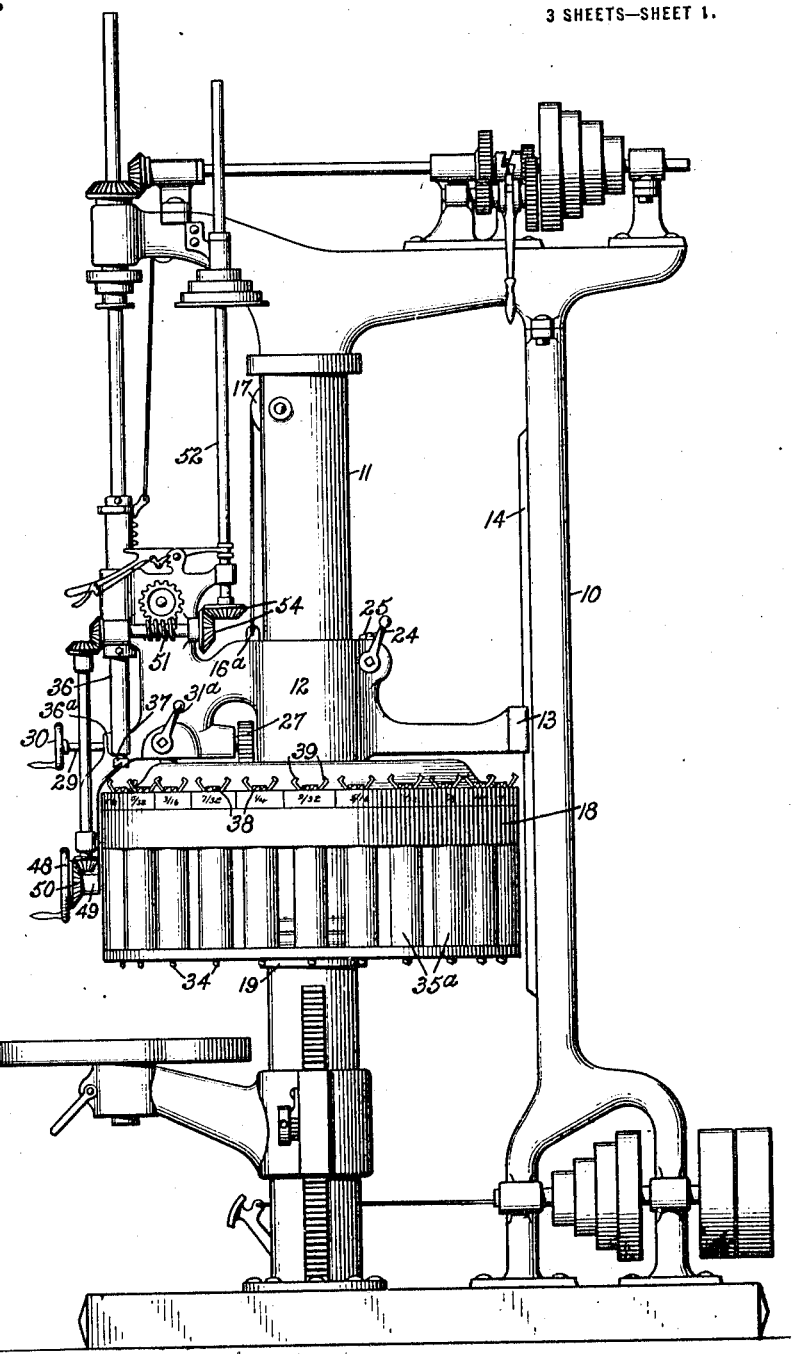
Figure 1 is a side elevation of a machine embodying my invention.
Figure 2:
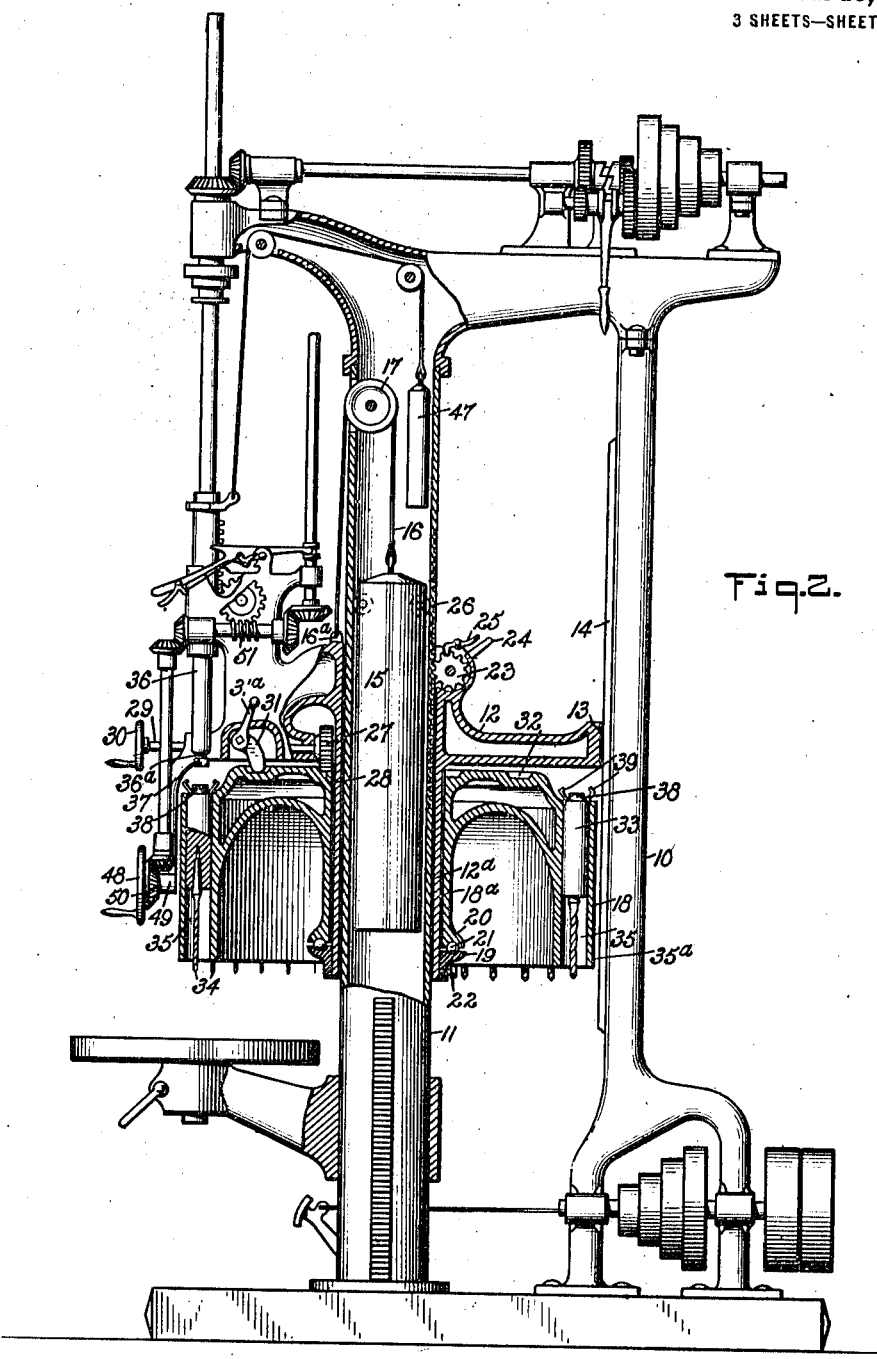
Fig. 2 is a transverse vertical section thereof.

My invention may be carried out in various forms, there being shown in Fig. 1 a frame designated generally by the numeral 10 having a tubular post 11. On the post 11 or other vertical guide means provided in the machine, is vertically movable a drill head designated generally by the numeral 12 which is given guided linear movement by engagement with a suitable frame member, the said head as seen in Figs. 1 and 2 having a member 13 formed with a vertical groove receiving a vertical guide rib 14 on the frame head. The drill head 12 preferably is counter-balanced in practice, for which purpose a weight 15 is hung within the post 11 on a cord 16 running over a sheave 17 to the outside of the post and made fast at its opposite end as at 16ᵃ to said drill head.

On the drill head 12 I revolubly mount a tool carrier 18, the drill head having a depending sleeve 12$^a$ embracing the post 11 and the tool carrier 18 having a depending inner cylinder 18$^a$ turning on the said sleeve 12$^a$. The cylinder 18 rests in the illustrated example on a bearing collar 19 on the sleeve 12$^a$ at the lower end, there being a mating bearing member 20$^a$ on the cylinder 18$^a$ so that the said elements 19 and 20 constitute a race for ball bearings or roller bearings 21. The collar 19 in the illustrated example is shown as secured by a set screw 22 simply as one means for the purpose. To raise and lower the drill head 12 and thereby adjust the height of the tool carrier 18, I may employ a pinion 23 on the shaft of which is a handle 24 for turning the same, a locking pawl 25 being provided. The pinion 23 meshes with a vertical fixed rack 26 on the post 11 so that the turning of the pinion by the handle 24 when the pawl 25 is released causes a vertical movement of the drill head, the pawl serving to lock the pinion against turning to hold the drill head at a given elevation.

In order to turn the tool carrier 18 on the drill head, a pinion 27 is in mesh with an annular concentric gear or rack 28 on the tool carrier, the shaft 29 of said pinion 27 turning in suitable bearings on the drill head 12 and having a handwheel 30 or the like for turning said shaft to thereby turn the tool carrier through any desired angle. To hold the tool carrier 18 against turning, a second annular rack or gear 32 is formed thereon or secured thereto and adapted to be engaged by a dog 31, on the shaft of which a handle 31$^a$ is provided for rocking it into or out of engagement with the said rack 32.

The tool carrier 18 is equipped with an annular series of chucks or tool holders 33 adapted to hold individual drills 34 of varying sizes or other tools for performing different operations as will be readily understood. The chucks 33 are adapted to turn and be moved axially in cylindrical bores 35 formed by sleeves or individual cylinders 35$^a$. The tool holders 33 correspond in number with the teeth of the annular rack 32 whereby the pawl 31 may be caused to lock the tool carrier 18 with any given tool holder vertically alining with the drill spindle or drive spindle 36 which is adapted to be driven and fed by the usual means, common to machine drills generally. On the spindle 36 and on each chuck 33 are mating clutch elements 37, 38, respectively, or equivalent co-engaging drive elements. In connection with the chucks and the spindle, I provide means whereby to effect automatic clutched and latched engagement between the spindle and chuck by a longitudinal movement of the spindle. As best seen in Figs. 3 and 4 latches 39 are used for the purpose, disposed at opposite sides of each chuck 33 and pivoted thereon at the lower ends as at 40 to swing laterally. Each latch 39 is under the pressure of a suitable spring 41 here shown as a plate spring secured at its lower end to the chuck as at 42 and bearing at its upper end against a shoulder 43 on the latch 39 adjacent to the pivot thereof. The tendency of the spring 41 is to throw the latches 39 outward. The outward movement of the latches by the springs is permitted when the chuck 33 is raised to a position for the latches to clear the upper end of the sleeve 35$^a$ in which position the latches, by engagement with the upper end of said sleeve, hold the chuck suspended. The arrangement is such that an axial movement of the spindle 36 to bring the clutch elements 37, 38 into engagement and move the chuck 33 longitudinally in the bore 35, thereby causes the engagement between the latches 39 and the upper end of the sleeve 35$^a$ to swing the said latches 39 laterally inward parallel or substantially so with the chuck and engage the upper ends of the latches in an annular groove 36$^a$ formed on the spindle 36. Upon the spindle 36 being raised, the engagement of the latches in the groove 36$^a$ thereon will cause the chuck 33 to be raised until the latches again clear the upper end of the sleeve and permit the springs 41 to swing the latches outward and release the chuck from the spindle. It will be clear that with the described construction any drill or other tool can be quickly brought into position beneath the spindle so that by the simple lowering of the spindle it effects the clutched and latched engagement with the chuck and the raising of the spindle effects the automatic release and the suspending of the released chuck. The tool carrier 18 is cylindrical in practice and the chucks or tool holders thereon are in annular series. The reason is this construction permits the maximum number of tools being assembled in a given space and movable in a path for the individual tools to be optionally alined with the drive spindle.

It will be readily understood that the cylindrical tool carrier and chucks may be embodied in other machine drills or the like, one example being given in Fig. 5, in which the cylindrical tool carrier designated 18$^a$ is applied to a blacksmith's hand drill of known form, the only material change being that if the position of the shaft 44 does not accord with the position of the drill spindle 36$^b$, the shaft 44$^b$ may be substituted, having one end 44$^a$ offset, the other end being straight to permit the placing and removal of the tool carrier. The turning of the shaft more or less will cause the chucks to travel in a path for alining with the drill spindle which in this example is equipped with a clutch head 37ª corresponding with the clutch element 37 and presenting an annular groove 36ᶜ corresponding with the latch groove 36ª. The shaft 44 or 44ᵇ turns in upper and lower bearings 45 having set screws 46. If necessary to properly position the said bearings, a liner or block 44ᶜ is employed corresponding in thickness with the degree of adjustment of the shaft 44ᵇ. A set collar 44ᵈ on the shaft beneath the tool carrier 18ª serves to support the latter.

The illustrated means for driving and feeding the spindle 36 is of known form, there being a handwheel 48, the shaft of which turns in a hanger bearing 49 on the drill head 12 and is provided with a bevel wheel 50 acting through the known form of drive connections as illustrated, to manually actuate the feed worm 51 for raising or lowering the spindle, there being also the usual power driven shaft 52 geared with the shaft of the worm 51. It is to be understood that the drive and feed means form no part of the present invention as any standard means for the purpose may be employed.

I wish to state in conclusion that although the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. The combination of a tool chuck, a spindle adapted for driving engagement with the chuck, and holding means to retain the chuck in driving engagement with the spindle, said holding means being carried by the chuck and disengageable from the spindle to release the chuck therefrom and adapted to sustain the released chuck in position to be again engaged with the spindle.

2. The combination of a chuck, means in which said chuck may turn, a drive spindle for the chuck, and holding means movable to positions to hold the chuck in driving engagement with the spindle or to be supported by the first means and thereby sustain the chuck in position for engagement with the spindle.

3. The combination of a chuck having clutch elements, relatively fixed frame, a drive spindle having mating clutch elements, and latch means mounted on the chuck and swingable into engagement with the spindle to hold the chuck in clutch with the spindle or to an outer position disengaged from the spindle and into engagement with said frame to support the chuck.

4. The combination of a chuck, means having a bore in which the chuck may turn or slide, a drive spindle movable axially relatively to the chuck and to the said bore, and movable means, adapted in one position thereof to hold the chuck in driving connection with the spindle, and adapted in another position to support the chuck in said bore, said movable means being controlled by the axial movement of the spindle to disengage the chuck and spindle or to hold the same in driving connection.

5. The combination of a chuck, a drive spindle therefor, said chuck and spindle having mating clutch elements, means in which the chuck is revoluble and slidable, and holding elements pivoted on the chuck to turn and to slide therewith, said spindle having means to permit engagement of the said elements with the spindle to hold the chuck clutched, and said holding elements when the chuck is in position for release being swingable laterally out of engagement with the spindle and into supporting engagement with the first mentioned means.

6. The combination of a chuck, means having a bore in which the chuck is adapted to turn, a spindle adapted to have driving engagement with the chuck, said chuck and spindle being movable longitudinally relatively to the first means, holding elements pivoted on the chuck at the rear end and movable therewith to a position at the rear of the said bore or within the same, and spring means acting on said elements and arranged to swing the same laterally outward into engagement with the first mentioned means, at the rear end of the bore thereof, to sustain the chuck in position to be engaged by the spindle, the forward movement of the chuck serving to swing said holding elements laterally inward against the tension of the spring means and into engagement with the spindle to hold the chuck in driving engagement with the spindle.

CHARLES EUGENE COX.